No. 742,758. PATENTED OCT. 27, 1903.
T. L. VALERIUS.
FLOAT VALVE.
APPLICATION FILED JAN. 24, 1903.
NO MODEL.
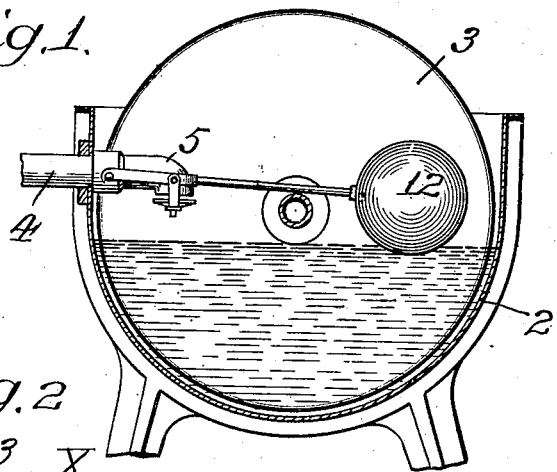
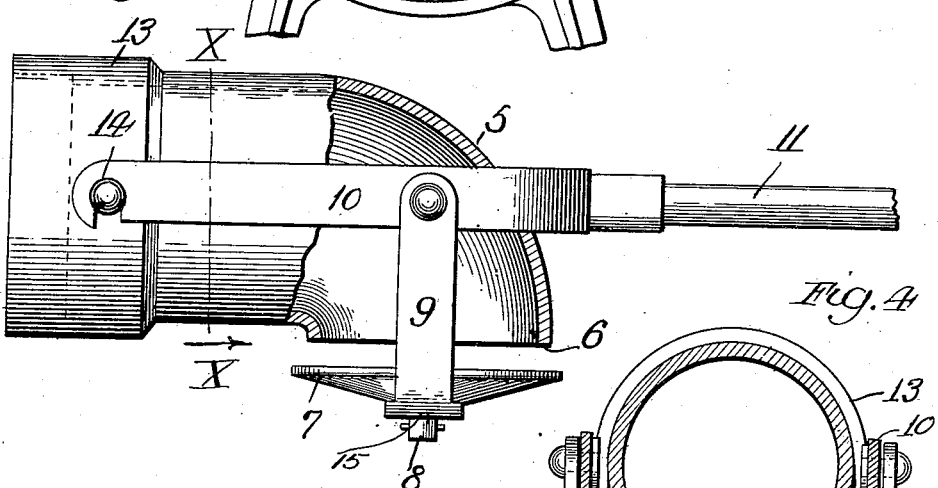
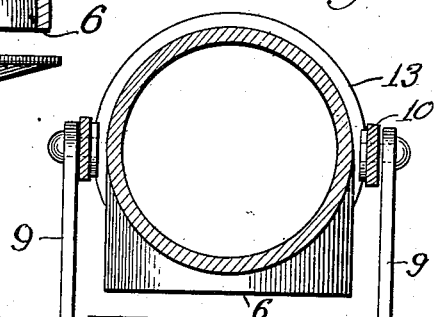
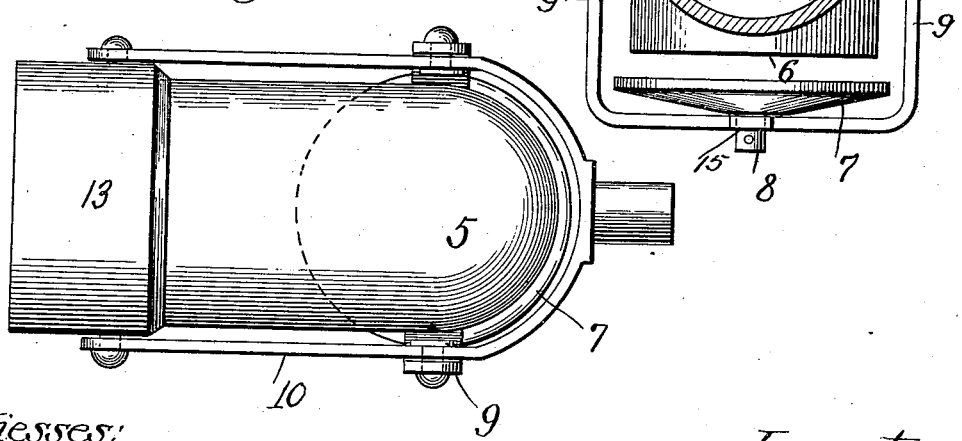
Witnesses:
Inventor:
Theodore L. Valerius.
By C. Hawley, Atty.

No. 742,758.

Patented October 27, 1903.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

FLOAT-VALVE.

SPECIFICATION forming part of Letters Patent No. 742,758, dated October 27, 1903.

Application filed January 24, 1903. Serial No. 140,396. (No model.)

*To all whom it may concern:*

Be it known that I, THEODORE L. VALERIUS, a citizen of the United States, residing at Fort Atkinson, Jefferson county, Wisconsin, have invented certain new and useful Improvements in Float-Valves, of which the following is a specification.

My invention relates to float-controlled valves, and has particular reference to valves through which liquid is supplied to tanks and the like wherein the controlling-floats are arranged.

The object of this invention is to provide a float-valve of simple construction, one which shall be adapted to close tightly against a light pressure of liquid within the valve, one which shall be made of metal, and one which may be easily dismembered and cleaned.

A special object of my invention is to provide a cheap, cleanly, and effective float-valve for milk and cream vats.

To this end my invention consists generally in a float-valve of the construction hereinafter described, and particularly pointed out in the claims.

The invention will be more readily understood by reference to the accompanying drawings, forming a part of this specification, and in which—

Figure 1 illustrates a milk or cream vat provided with a float-valve embodying my invention. Fig. 2 is an enlarged side elevation of the valve, the spout being partly broken away to show its internal form. Fig. 3 is a plan view of the valve, and Fig. 4 is a sectional view on the line $x\ x$ of Fig. 2.

My invention is applicable for controlling the flow of liquid under light pressure to any vat; but in the drawings I have illustrated the same in connection with the vat 2 of a milk and cream cooler or heater, whereof 3 is the tempering member. The supply-pipe 4 enters through the side of the vat at a point above the normal liquid-level. On the inner end of the pipe 4 is a nozzle 5, which opens downwardly and is of substantially the same internal size throughout. The lower end of the nozzle is finished to present a smooth seat or edge 6 for the valve-disk 7. This disk is flat upon its upper surface and is made of metal. It is provided with a central stud 8, which rests loosely in an opening 15, provided at the middle of the swinging yoke 9. The yoke 9 is pivoted upon and hangs from the fork 10 of the float-arm 11.

12 represents the float.

The body 13 of the nozzle, which receives the pipe 4, is somewhat larger than its lower end, and this part is provided with the pins 14, on which the float-arm is pivoted. The pins are preferably provided with heads to hold the ends of the fork 10, and in order that the float-arm may be detached from the valve the ends of the fork are notched to drop over the pins 14, so that the fork may be easily lifted from the pivot-pins or removed from the valve. The perpendicular pivots or connections between the valve-disk 7 and the yoke 10 constitute a universal joint, and when the float-arm is raised the disk will be forced squarely against the seat or end of the nozzle without regard to the alinement of the yoke, the fork, and the pivots. This constitutes a particular advantage of my valve and enables me to employ an all-metal disk without valve-packing of any sort. It will be seen that when the ends of the yoke are lifted from the pivot-pins 14 the float-lever and the valve may be taken away to be cleaned. While the valve and arm are removed the interior of the valve-nozzle is accessible for cleaning.

Having thus described my invention, I claim as new and desire to secure by Letters Patent—

1. The metal valve-nozzle, having a valve-seat at its end, in combination with the float-lever, the yoke pivotally attached thereto and depending therefrom, and the disk within said yoke and swiveled thereto, as and for the purposes specified.

2. The metal valve-nozzle, having a horizontal valve-seat, in combination, with the float, the float-arm detachably engaged with the nozzle, the yoke swinging from the said arm, the metal valve-disk within said yoke and having a vertical pivot therein, substantially as described.

3. In a float-valve, in combination, a nozzle, pins 14 on either side of said nozzle, a float-arm having a fork, said fork being adapted to engage with and rest on said pins, a pivoted yoke depending from said fork, and a valve-disk loosely mounted in said yoke, substantially as described.

4. In a float-valve, in combination, a downwardly-curving nozzle, a float-arm having a fork, said fork detachably connected with said nozzle, a yoke pivotally attached to said fork and depending therefrom, and a valve-disk pivotally attached to and within said yoke and adapted to close said nozzle, substantially as described.

In testimony whereof I have hereunto set my hand, this 20th day of January, 1903, in the presence of two witnesses.

THEODORE L. VALERIUS.

Witnesses:
H. H. CURTIS,
CHAS. W. FERRIS.